United States Patent
Zarian et al.

(10) Patent No.: US 6,363,197 B1
(45) Date of Patent: Mar. 26, 2002

(54) FIRE RETARDANT AND/OR SELF-EXTINGUISHING FIBER OPTIC ASSEMBLIES

(75) Inventors: James R. Zarian, Corona Del Ma; Dennis L. Sitar, Trabuco Canyon; John A. Robbins, Lake Forest; Sharon Doh, Irvine, all of CA (US)

(73) Assignee: Lumenyte International Corp., Irvine, CA (US)

( * ) Notice: Subject to any disclaimer, the term of this patent is extended or adjusted under 35 U.S.C. 154(b) by 0 days.

(21) Appl. No.: 09/171,897
(22) PCT Filed: Jul. 17, 1998
(86) PCT No.: PCT/US98/14800
§ 371 Date: Oct. 28, 1998
§ 102(e) Date: Oct. 28, 1998
(87) PCT Pub. No.: WO99/04297
PCT Pub. Date: Jan. 28, 1999

Related U.S. Application Data
(60) Provisional application No. 60/053,075, filed on Jul. 18, 1997.

(51) Int. Cl.[7] .................................................. G02B 6/02
(52) U.S. Cl. ........................................................ 385/128
(58) Field of Search ................................. 356/123–128

(56) References Cited

U.S. PATENT DOCUMENTS

| | | | |
|---|---|---|---|
| 4,344,669 A | * | 8/1982 | Uchida et al. .............. 385/128 |
| 4,708,975 A | | 11/1987 | Shain et al. ................. 523/216 |
| 4,781,433 A | | 11/1988 | Arroyo et al. |
| 4,826,899 A | | 5/1989 | Rees et al. .................... 524/94 |
| 4,889,400 A | | 12/1989 | Pinson |
| 4,969,706 A | | 11/1990 | Hardin et al. |
| 5,067,831 A | * | 11/1991 | Robbins et al. ............. 385/123 |
| 5,111,523 A | | 5/1992 | Ferlier et al. ............... 385/100 |
| 5,136,683 A | | 8/1992 | Aoki et al. .................. 385/141 |
| 5,173,960 A | | 12/1992 | Dickinson ................... 385/100 |
| 5,204,928 A | | 4/1993 | Konda et al. ............... 385/128 |
| 5,358,011 A | | 10/1994 | Stockton et al. ............ 138/103 |
| 5,392,374 A | | 2/1995 | Gorian et al. ............... 385/100 |
| 5,432,876 A | * | 7/1995 | Appeldorn et al. .......... 385/31 |
| 5,525,757 A | | 6/1996 | O'Brien .................. 174/121 A |
| 5,563,975 A | | 10/1996 | Gorian et al. ............... 385/100 |

* cited by examiner

Primary Examiner—Frank G. Font
Assistant Examiner—Amanda Merlino
(74) Attorney, Agent, or Firm—Small Larkin, LLP

(57) ABSTRACT

The present invention relates to an illumination fiber optic (20) or an assembly including illumination fiber optics contained in a first polymeric layer (26) or in a channel and the first layer or channel including intumescent or other fire retardant material, and further contained within a second outer layer (28) or jacket made of a polymeric material which has the property of containing the combination sufficient to hinder the propagation of the fire and eventually extinguishing the flame. The fiber optic may be side light emitting, with the core, layer, channel and fire retardant materials being transparent or translucent, or may be end light emitting with the fiber optic being a layer core fiber optic and the outer layer being opaque.

2 Claims, 2 Drawing Sheets

FIRE RETARDANT AND/OR SELF-EXTINGUISHING FIBER OPTIC ASSEMBLIES

This application claim benefit of Provisional application Ser. No. 60/053,075 filed Jul. 18, 1997.

TECHNICAL FIELD

The present invention relates to illumenation fiber optic conduits, and fiber optic configurations or assemblies composed of fiber optics, channels and/or jacketing(s) adapted to render them fire retardant and/or self-extinguishing. The conduits can be large core plastic optical fiber linear and end light emitting, or side light emitting conduits.

BACKGROUND ART

Fiber optic conduits are well-known for illumination applications and have been described in numerous publications. Methods of preparation and use have also been extensively disclosed in these publications, such as U.S. Pat. Nos. 5,298,327 and 5,067,831.

Most illumination fiber optics are made from thermoplastic or thermoset polymeric materials and mostly are cladded by fluoropolymers. In some instances, clear jacketings are also extruded onto a single or multiple fiber optics to afford resistance against environmental and or mechanical damage or to enhance the optical appearance. In another instance, the fiber optics are configured by cutting or notching, among other methods to emit the light radially at a predetermined e.g., 45 degree angle relative to the longitudinal axis of the optic. Also, a polymeric channel may be utilized as a reflector or as a component to affix the orientation of the cuts in such side (linear light) emitting optics and, consequently to affix orientation of the emitted light. Because of the polymeric nature of the components included in the assemblies, these light forms are susceptible to fire, and burn easily and may thereby contribute to progression of fire in areas such as buildings, marine vessels, ground and air transportation vessels and the like in their unmodified form. In some applications, the end light emitting optics have been encased in metal conduits that are similar to conduits utilized in electric wiring applications. Such an arrangement prohibitively increases the cost of the application, both in terms of materials and labor. In the side emitting configurations, this type of conduit can not be used, because the pathway for light emission is blocked. The disadvantages disclosed above limit the applications for construction, transportation, signs, emergency vehicles, and traffic management among others.

The present invention is directed to large core plastic optical fibers (LCPOF), as that term has become known in the industry, which are modified to provide a fire retardancy or fire extinshing capability. LCPOF is distinguished from fiber optic conduits used in the communication field principally in terms of the size, i.e., outer diameter of the core, as well as the core material composition. The core is the component of the fiber optic which actively transmits the electromagnetic radiation. Also, LCPOF is distinguished from communications type fiber optics in that it is generally limited to transmission of radiation in the visible light spectrum, i.e., in the range of about 360–800 µm. Hence, LCPOF is usual for end-lit or side-lit illumination applications. Typically an LCPOF is a fiber optic which includes a core having a minimum diameter of approximately 3.0 millimeters. LCPOF ranges in size from a diameter of about 3.0 millimeters up to and including about 25 millimeters (about 1.0 inch) for most applications.

In many applications, light transmitting fiber optic conduits and/or assemblies must meet or exceed specific fire, smoke and toxicity standards imposed by various civilian governmental agencies, military services, independent testing laboratories and/or other regulatory agencies. For example, for the construction industry, the optics must comply with and/or pass the testing procedures of Underwriters Laboratory Standard 910. In military applications, the assembly must pass the Military Specification C 24643-A ( Mil Spec C 24643-A) Flame Test, or Underwriters Laboratory IEEE 383 1974. With respect to toxicity and smoke generation, the assembly must meet certain standards, such as Naval Engineering Standard 711 (NES 711 Smoke Index Test) and Naval Engineering Standard 713 (NES 713 Toxicity Index Test).

For end emitting assemblies, particularly for communication applications, some fire retardant arrangements are known, such as described in U.S. Pat. Nos. 5,173,960; 5,204,928; and 5,136,683. Nonetheless, such assemblies have been found not to be useful in LCPOF applications. Such assemblies, similarly, can not be utilized for side or linear emitting type applications.

DISCLOSURE OF INVENTION

The present invention relates to individual polymeric optical conduits and optical conduit assemblies that include fire retardants, polymeric fiber optic(s), channel(s) and/or jacketing(s) whereby flame retardancy is enhanced and the optic and/or assembly is made, preferably, self extinguishing. Preferred embodiments of the present invention also exhibit relatively low smoke generating properties and relatively low toxicity in order to meet governmental and industry standards.

Preferred embodiments of the present invention are directed to either side light emitting fiber optics and assemblies and/or LCPOF end emitting fiber optics and assemblies all of which include a polymeric thermoset core that is clad with a fluoropolymer cladding. The assemblies also include at least one jacket, and in some preferred embodiments two jackets, which encase the clad core as well as, in some instances a channel which partially surrounds the clad core. In accordance with the present invention, a fire retardant material, such as, for example, an intumescent material, is positioned outside of the clad core and either incorporated within one or both of the surrounding jackets, is incorporated into the channel material, or is otherwise positioned in a layer between the outermost jacket and the clad core. The fire retardant material is generally placed along the length of the clad core fiber optic and at least partially surrounds the radial periphery of the clad core, so that in case of a fire, the fire retardant material will function to retard the fire. In some preferred embodiments and under some conditions the material will function to extinguish the fire.

Within the scope of the present invention, the preferred fire retardant material used in the present invention is an intumescent material. For purposes of the present invention, the term intumescent is used in the sense as defined by Whittington's Dictionary of Plastics, Third Edition (1993), published by Technomatic Publishing Company of Lancaster, Pa., at page 260 as: "The foaming and swelling of a plastic when exposed to high surface temperature of flames. It has particular reference to ablative urethane used on rocket nose cones, and to INTUMESCENT COATINGS, . . . ".

In a first preferred embodiment of the invention, the polymeric thermoset light transmitting clad core is jacketed with a first polymeric jacket that includes intumescent material incorporated therein. The intumescent, jacketed clad core is surrounded by a second jacket, which is also made of a polymeric material, and which functions to contain the first jacket during a fire sufficient to cause jacket 1 to expand radially inwardly, rather than outwardly, and to form a char in the light transmitting clad core, thus hindering the propagation of the fire and, preferably, extinguishing the flame.

Alternatively, a second preferred embodiment comprises a polymeric thermoset light transmitting core, cladded with a fluoropolymer and subsequently jacketed with a polymeric jacket including an exuding type of fire retardant material (jacket 1) and further jacketed by a polymeric material (jacket 2) which has the property of containing jacket 1 sufficiently whereby, in the case of a fire, jacket 1 exudes a fire retarder such as water, onto the light transmitting clad-core, thus hindering the propagation of the fire and eventually extinguishing the flame. Specifically, with respect to the second preferred embodiment, in contrast to the first preferred embodiment in which the fire retardant material is an intumescent material, and expands during a fire, the fire retardant material used in the second preferred embodiment does not expand, but exudes. For example, in the second preferred embodiment, a material which contains compounds, that under fire conditions, will react to form a fire retardant or extinguishing material, such as water, in sufficient amounts is used.

Alternatively, a third preferred embodiment comprises a plurality of light transmitting cores, each cladded with a fluoropolymer, that are held in a bundle and with the bundle subsequently jacketed with a first polymeric jacket that includes intumescent materials and further jacketed by a second polymeric material which has the property of containing the first jacket sufficiently whereby, in the case of a fire, the first jacket expands, preferably inwardly—rather than outwardly—while forming a char onto the light transmitting clad-cores, thus hindering the propagation of the fire and eventually extinguishing the flame.

A fourth preferred embodiment of the present invention includes a polymeric thermoset light transmitting core, cladded with a fluoropolymer that is notched at predetermined intervals along its length. The notched, clad core is then placed and precisely oriented within a polymeric channel light that is emitted from the cuts and toward the channel and then reflected out of the optic at a predetermined angle. The channel and its associated clad core is then jacketed with a polymeric material that is, preferably, transparent or translucent, and which has the property of containing the channel and clad core sufficiently whereby, in the case of a fire, the channel expands inwardly—rather than outwardly—while forming a char onto the light transmitting clad-core, thus hindering the propagation of the fire and preferably, eventually extinguishing the flame.

In a fifth preferred embodiment, the present invention assembly includes a polymeric thermoset light transmitting core, cladded with a fluoropolymer, notched at predetermined intervals, and oriented within a polymeric channel—to emit light away from the cuts at a predetermined angle. The fifth embodiment is also contained within an outer conduit, and is the fourth embodiment. In this fifth embodiment the channel includes a non-intumescent, fire retardant material which has the property of containing the channel and clad-core sufficiently whereby, in the case of a fire, the channel exudes a fire retarder onto the light transmitting clad-core, thus hindering the propagation of the fire and eventually extinguishing the flame.

The illumination fiber optic assemblies of the present invention exhibit fire retardancy and/or self-extinguishing properties when exposed to fire. Also, the embodiments of the present invention, preferably, exhibit sufficiently low toxicity and low smoke to comply with appropriate federal (such as military), state, and local requirements, as well as to comply with various industry standards, such as set forth in various independent testing laboratory procedures. Illumination fiber optic assemblies exhibiting such fire, smoke and toxicity properties are believed to have been unknown prior to the present invention.

BRIEF DESCRIPTION OF THE DRAWINGS

Other objects and advantages of the invention will become apparent from the foregoing detailed description taken in connection with the accompanying drawings, in which.

BEST MODE FOR CARRYING OUT THE INVENTION

With reference to FIGS. 1–8, the various types of fiber optic conduits and fiber optic conduit assemblies will be briefly described, and, subsequently, methods of preparation and their functioning during fire conditions will be further described.

Figure 1:
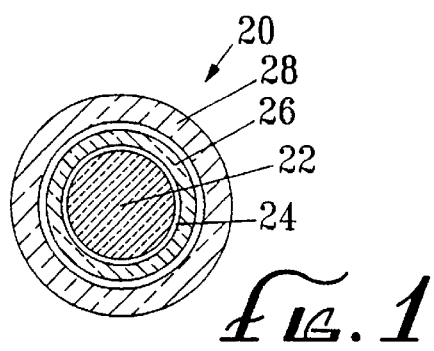
FIG. 1 is a cross-sectional view of an end light emitting fiber optic conduit of the present invention.
Figure 2:
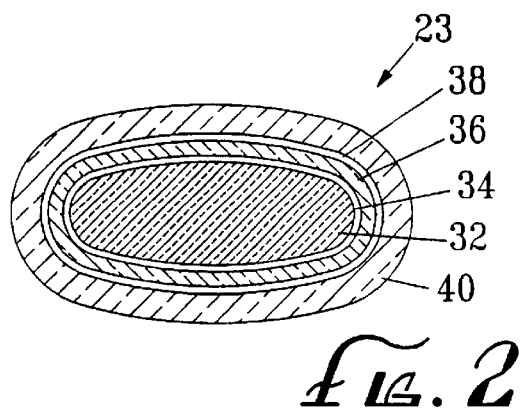
FIG. 2 is an alternate embodiment of an end light emitting fiber optic conduit of the present invention, showing a different cross-section than the FIG. 1 embodiment.
Figure 3:
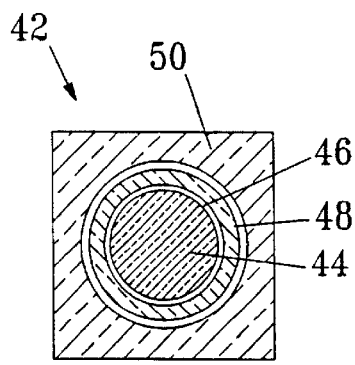
FIG. 3 is a third alternate embodiment of an end light emitting fiber optic of the present invention, showing a different cross-section than either of FIGS. 1 or 2.

With reference to FIGS. 1, 2 and 3 end light emitting LCPOFs for use in the present invention will be described. FIG. 1 shows and end light emitting clad core fiber optic 20 which includes a conventional polymeric, preferably thermoset core 22 surrounded by a cladding made of, preferably, fluropolymer 24. Surrounding the clad core is a first, or inner jacket 26 which is made of a polymeric material which contains fire retardant materials as will be described hereinafter. Surrounding the inner jacket 26 is an outer or second jacket 28. FIG. 1 illustrates what appears to be a gap between the first jacket 26 and the clad core 22, 24, and a gap between the first jacket 26 and the outer or second jacket 28. This figure, as well as the other figures are not drawn to scale in this regard, but is shown only for the purpose of illustrative the relationship of the core, clad and jackets, each to the other. While there does exist a gap, of perhaps as little as only several molecules in thickness, for all practical purposes, there is no actual gap between the clad core in the first jacket, and, subsequently, the first jacket and the second jacket. As is well known in the field of illumination fiber optics minimization of the gaps between the components is desired. Preferably the first jacket is crosshead extruded over the clad core and, the second or outer jacket is co-extruded or subsequently crosshead extruded over the first jacket, to form a relatively tight fitting multilayered fiber optic. As will be further described, the fire retardant materials are included as as ingredient used to form the inner jacket, or the channel.

FIG. 2 is a drawing of another LCPOF, for use in end light emitting applications, but having a different cross-section than the FIG. 1 LCPOF. FIG. 2, LCPOF 23 includes a thermoset core 32, a clad 34, a first or inner fire retardant material containive jacket 36, and, as described above, an apparent gap 38, which for all practical purposes is nonexistent, and may be up to several molecules in thickness. Second or outer jacket 40 is also shown surrounding the first or inner jacket 36. FIG. 3 illustrates yet another end light emitting LCPOF having a different cross-section. The FIG. 3 LCPOF 42 includes a thermoset core 44, a fluropolymeric cladding 46, an inner or first fire retardant material containing jacket 48, and an outer or second jacket 50.

Figure 4:
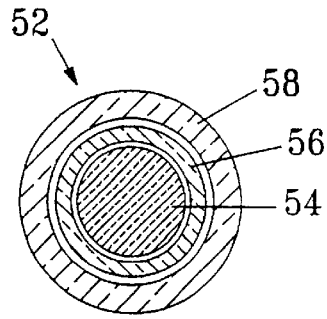
FIG. 4 is a cross-sectional view of a side light emitting fiber optic conduit of the present invention.
Figure 5:
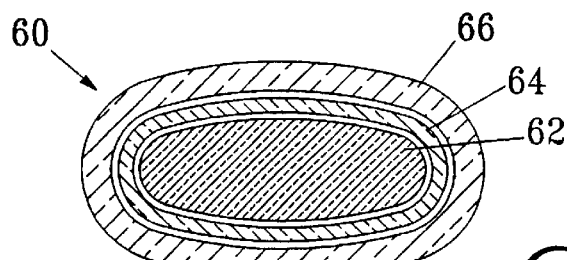
FIG. 5 is an alternate embodiment of a side light emitting fiber optic conduit of the present invention having a different cross-section than that of the FIG. 4 embodiment.
Figure 6:
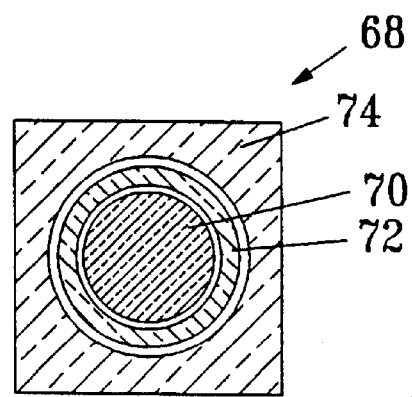
FIG. 6 is an alternate embodiment of a side light emitting fiber optic conduit of the present invention, having a different cross-section than either the FIG. 4 or FIG. 5 embodiment.

Referring to FIGS. 4, 5 and 6, a side light emitting LCPOF having different cross-sections will be described. FIG. 4 illustrates side light emitting LCPOF 52 having a polymeric thermoset, clad core 54 surrounded by a first or inner fire retardant material containing jacket 56 which in turn is surrounded by an outer or second jacket 58. As described above, the apparent gaps are not representative of any gap between the components, but are shown for illustration purposes only to accentuate the different materials of the clad core, the first or inner jacket 56 and the second or outer jacket 58. With respect to the side light emitting embodiments of FIGS. 4, 5 and 6, in comparison to the end light emitting embodiments of FIGS. 1, 2 and 3, it is noted and emphasized that both of the inner and outer jacket materials for side light emitting fiber optics are made of transparent or translucent materials. In this way, the light being transmitted along the length of the clad core can also radiate outwardly through the sides of the fiber optic.

Referring to FIG. 5, side light emitting LCPOF 60 includes a thermoset clad core 62, a first or inner translucent or transparent fire retardant material containing jacket 64 and an outer or second translucent or transparent jacket 66. The LCPOF 60 has a different cross-section than does the LCPOF 52 as shown in FIG. 4.

FIG. 6 illustrates another embodiment of an LCPOF, side light emitting fiber optic 68 which includes a thermoset clad core 70, a first or inner translucent fire retardant material containing or transparent jacket 72 and an outer or second translucent or transparent jacket 74 having a different cross-section than either of the LCPOFs 52 or 60.

Figure 7:
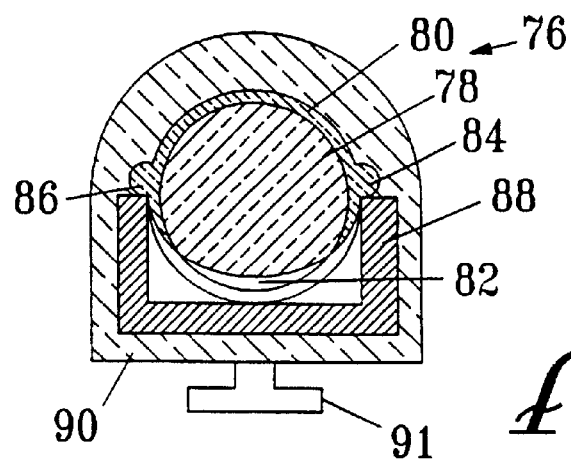
FIG. 7 is a cross-sectional view of a side light emitting fiber optic of the present invention including a light directing channel and light directing notches incorporated therein.

FIG. 7 shows a side light emitting LCPOF 76 which has been notched, and precisely positioned within a light reflecting channel. The FIG. 7 embodiment and is the most preferred mode of practicing the invention. LCPOF 76 includes a thermoset, polymeric core 78 which is surrounded by a fluropolymer cladding 80, not drawn to scale. Also shown, near the bottom of the clad core, as oriented in FIG. 4, is a notch 82, which functions to direct light emitting radially outward from the clad core, as is known. Additional notches are placed along the length of this clad core at predetermined intervals, in accordance with known principals. Also shown, at 84 and 86, are enlarged regions or clad core orienting members or beads 84 and 86 which function to orient the notched or slit clad core 78, 80 properly and precisely within a light reflecting channel 88, as is known, and not shown to scale. Surrounding the clad core contained in the channel is a jacket 90, also not shown to scale, which is preferably extruded over the channel and clad core assembly, as is also known. The channel 88 includes a fire retardant material that has been included in a predetermined quantity. The FIG. 7 embodiment is for a side light emitting application, and therefore, the jacket 90 is also of a translucent or transparent material. Optionally, and preferably, a fixing member, T-section post 91 is formed as part of the jacketed extrusion 90. The T-section attachment post 91 functions to permit ease of attachment of the finished fiber optic into a wall mounting channel or assembly and, more importantly, to pre-orient the fiber optic for optimum light distribution to a designated area. As is known, the channel is made of light reflecting material and/or has on its inner surface a light reflecting material so as to maximize the reflectivity of the channel and light distribution of the light radially outward from the fiber optic.

Figure 8:
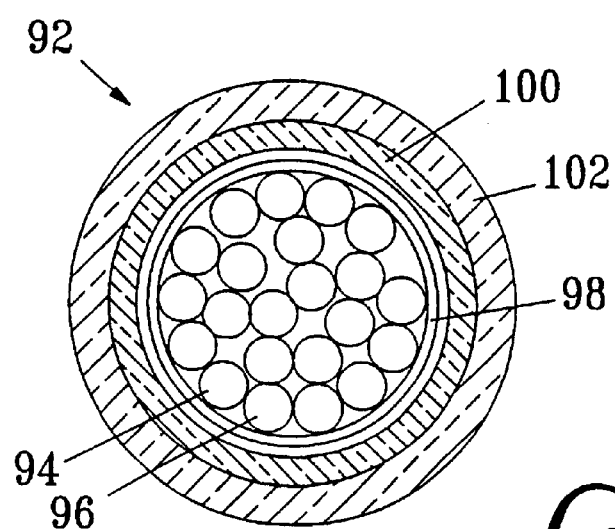
FIG. 8 is a cross-sectional view of a fiber optic conduit assembly of the present invention including a plurality of clad cores assembled to form a bundle within a first and second jacket in accordance with the present invention.

Referring to FIG. 8, a multi-core, bundled fiber optic assembly 92 is described. Forming the center of the bundle are a plurality of clad cores two of which are shown at 94, 96, and which are, preferably of a thermoset core material clad with a conventional fluropolymer cladding. The cladding is thus, as well as other may be of a heat shrink type. Two such clad cores are shown at 94, 96, with each clad core referred to as a clad core sub-assembly with the remaining plurality also shown, but not numbered. The number and size of each of the clad core sub-assemblies inside of the bundle is determined by the end use application. Surrounding the bundle of clad core sub-assemblies is a membrane 98 which functions to position and hold the clad core sub-assemblies in a bundle during subsequent processing. Preferably the membrane is of a polymeric material, most preferably a high temperature polyester or fluropolymer, as is known. Also, as is known, the bundle of clad core when wrapped with a membrane, is subsequently processed to include jacket sub-assemblies, or plural jackets surrounding the bundled clad core sub-assemblies by extruding a first, inner jacket 100 over the membrane containing the bundle of clad core sub-assemblies, and, optionally, extruding a second, outer jacket 102 over the first, inner jacket 100 in a conventional extrusion process. Preferably the inner jacket includes the fire retardant material in sufficient concentration to function as a fire retarding or fire extinguising agent in the presence of a fire.

With reference to the above figures, the present invention is directed to the use of fire retardant materials such as expanding, exuding and/or other fire retardant materials placed outside of the clad core and inside of the second or outer jacket of the fiber optic, as will be described in greater detail below.

Fiber optic assemblies of the present invention may be prepared by using previously known fiber optics and including in the jacketing, or elsewhere in the assembly, a fire retardant material. The then modified containing fire retardant assembly is then capable of being inflammable or self-extinguishing. The manufacturing of such assemblies can be done in a continuous or static process by manual assembly, wrapping, co-extrusion, tandem extrusion and/or any other commonly known optical conduit manufacturing processes. In general, the fire retardant material is used, in predetermined amounts or concentrations, as an ingredient for subsequent processes.

The fiber optics of the present invention that are particularly beneficial can include, but are not limited to: a thermoset light transmitting core cladded by a fluoropolymer, a plurality of thermoset light transmitting cores each cladded by a fluoropolymer, a thermoplastic light transmitting core cladded by a fluoropolymer, a reflective or refractive linear configuration intertwined within a plurality of light transmitting cores each cladded by a fluoropolymer, or any of the fiber optics above further jacketed by poly(vinyl chloride), polyacrylates, polymethacrylates, polycarbonates, silicones, among other polymers and combinations thereof which are suitable for use in an illumination fiber optic.

One feature of the present invention includes use of an expanding (intumescent) material as an ingredient in the base material for the jacketing or channel of the fiber optic. The base materials can include, but are not limited to, compositions of: polyolefins, copolymers of polyolefins, polyvinyls, polyesters, polycarbonates or any other commercially known thermoplastic or thermoset polymers. Thee base materials are then mixed with intumescent materials capable of expanding upon exposure to heat or fire, and other fillers, lubricants, retarders, plasticizers or other similar materials are added to facilitate the processing, manufacturing and assembly of the fire retardant or self-extinguishing fiber optics.

A second feature of the present invention includes use of an exuding component in the base material. The base materials beneficial for the preparation of channels or jacketings can include, but are not limited to, compositions of: polyolefins, copolymers of polyolefins, polyvinyls, polyesters, polycarbonates or any other commercially known thermoplastic or thermoset polymers as base materials in combination with an exuding type of fire retardant material. These materials exude an inflammable and/or a extinguishing constituent, upon exposure to heat or fire. Other fillers, lubricants, retarders, plasticizers or other similar materials may be added to facilitate the processing, manufacturing and assembly of the fire retardant or self-extinguising fiber optics. It is emphasized that with respect to the feature of the invention in which an exuding component is used, that most preferably, enough exuding material is used so that, during fire conditions the material not only retards or extinguishes the base polymer material used in the jacket or channel, but also performs a fire retardant or fire extinguishing function with respect to the clad core itself, by exuding sufficient retarders onto the clad core.

The jacketing, or base materials particularly useful in the present invention to form jackets and/or channels may include, transparent, translucent and/or opaque thermoplastic or thermoset polymers. The thermoplastic and thermoset materials may also contain fillers, fire retarders, lubricants, plasticizers and the like for ease of processing, and/or to augment the fire retardancy and/or self-extinguishing properties of the assembly. The suitable thermoplastics may include, but are not limited to polyvinyls, fluoropolymers, polycarbonates, fluoroelastomers, polyesters and other thermoplastics, including copolymers, terpolymers, with thickness and configuration sufficient to function for the intended purposes described herein. The thermosets suitable may include, but are not limited to silicones, copolymers of silicones, crosslinked polyolefins, polyisoprene and other similar materials having thickness and configurations suitable to function as described herein.

Within the scope of the present invention, the preferred exuding, fire retardant materials include metal hydroxides such as, most preferably magnesium hydroxide, as is well known, and which forms water upon exposure to fire and heat. Other, non-intumescent fire retardant materials useful in the present invention include aluminum trihydrate and zinc borate. In general, hydrated, hydroxide or carbonate forms of divalent or trivalent metals may be used. The expanding, or intumescent materials most preferred in the present invention are those which are commercially available from UV-tec of Arlington, Tex. as type FR-4150. FR-4150 consists of ethylene-propylene copolymer as base material and ammonium polyphosphate as the intumescent component. Alternatively, other intumescent material include silicone powders with vinyl and acrylate functionality supplied by Dow Chemicals, Midland, Mich., USA, proprietary formulations supplied by ALBI provided as ALBI-FRL, N.J., USA or organic and inorganic phosphates.

The processes of manufacture of the fiber optics, and fiber optic assemblies that may be used in the present include, but are not limited to: wrapping, tandem-extruding a channel and an outer jacket of a clad core sub-assembly; co-extruding jacketings and/or channels and jacketings onto the clad core sub-assemblies; co-extruding and curing the outer jackets. All the above processes can be done in a batch or continuous manner.

EXAMPLES

Examples 1–4

Appropriate lengths of SWN-500 clad-core fiber optics manufactured by Lumenyte International Corporation, Irvine, Calif., USA were selected and used as the notched linear, side light emitting clad core sub-assembly. Separately, U-shaped channels using an intumescing material designated as FR-4150 (intumescent), and manufactured by UV-tec, Arlington, Tex., USA were made by a conventional extrusion process. The channel had a U-shape cross section with an approximate thickness range of 2.03 to 3.05 mm in different areas of the cross-section profile along the length of the channels. Four of the optics were each placed in a channel and the channel-clad-core sub-assembly was co-extruded using two different fluoropolymers, i.e., for Example 1 and Example 2, and encased in two different silicone tubings, i.e., Example 3 and Example 4. The co-extrusion was performed by using conventional single screw extruders. The fluoropolymer used to prepare Example 1 was THV-500 manufactured by Dyneon (formerly 3M Company) of Minneapolis, Minn., USA. The thickness of the THV jacketing was approximately 2.03 mm. The fluoropolymer used to prepare Example 2 was FEP Teflon® FEP 100 manufactured by E. I. DuPont de Nemours of Wilmington, Del., USA. The thickness of the FEP jacketing was approximately 1.78 mm. Example 3 fiber optic was prepared by inserting the channel clad core sub-assembly into tubings made from Silicone Tufel SE 851 material manufactured by GE Silicones of Waterford, N.Y., USA, supplied to and fabricated by Purosil (a division of Burke Industries), Santa Fe Springs, Calif., USA. The thickness of the silicone jacketing was approximately 2.51 mm. The Example 4 optic was prepared by inserting the channel-clad-core sub-assembly into a tubing made from Silicone Q7-4765, a material manufactured by Dow Corning, Midland, Mich., USA, and supplied to and fabricated by Purosil (a division of Burke Industries), Santa Fe Springs, Calif., USA. The thickness of the silicone jacketing was approximately 2.51 mm.

All four examples were submitted to an independent testing laboratory for testing according to the Mil Spec C 24643-A Flame Test. Examples 1 and 2 failed the test. In each fiber optic assembly, the optic first flamed, and caused the channel to expand and burn. The expanding and burning channel in turn forced the melting fluoropolymer to rupture along the longitudinal axis of the assembly. The rupture permitted propagation of the flame and progression of the same events along its length of each fiber optic conduit. Examples 3 and 4 passed the test. In each assembly, the fiber optic first flamed, which caused the channel to expand and burn. The expanding channel material appeared, on subsequent visual inspection, to be forced inward by the outer jacket, thus retarding the progression of the flame. It is believed that the expanding and charring channel functioned to retard the burning of the fiber optic itself. Within an acceptable time, the fiber optic was completely engulfed by the expanded and charred material of the channel, and the Examples 3 and 4 fiber burning optics self-extinguished.

Although Examples 3 and 4 passed the flamability test, they did not pass the smoke and toxicity tests i.e., the smoke index and toxicity index were higher than required by the U.S. Navy according to the NES 711 Smoke Index Test and the NES 713 Toxicity Index text.

All of the examples 1, 2, 3 and 4 assemblies described above, were illuminated with a conventional fiber optic illuminator, model QL-60 manufactured by Lumenyte International Corporation, Irvine, Calif., USA, and projected light along the length of the assembly i.e., were linear side light emitting as expected. All materials covering the fiber optic channel component were either completely transparent or transparent to slightly translucent even in higher thicknesses ranges of 1.9–3.0 mm.

Example 5

An Example 5 fiber optic, similar to Example 2, was prepared. However, the base 65 channel material was made from fire retardant PVDF Solef 31508-0009 manufactured by Solvay Polymers, Inc., Houston, Tex. The channel had a U-shaped cross-section with an approximate thickness range of 2.0–3.0 mm in different areas of the cross-section profile along the length of the channels. When Example 5 was subjected to the Mil Spec C 24643-A, Flame Test, it failed. It is believed that although the PVDF material is a fire retardant, nonetheless, it does not exhibit intumescent properties and does not exude any compounds that would contribute to retarding the flame progression of the fiber optic. The samples for this example were not tested for toxicity or smoke because it did not pass the flamability test.

Example 6

An end light emitting assembly, Example 6, was prepared for UL 910 test by jacketing SWN-500, with an approximate outer diameter of 12 mm, clad-core fiber optics manufactured by Lumenyte International Corporation, Irvine, Calif., USA, by crosshead extrusion with exuding type fire retardant material designated as FR-6075 and manufactured by UV-tec, Arlington, Tex., USA. The jacketing covered the whole perimeter of the clad-core sub-assembly, with an approximate thickness of 2.03 mm. According to the manufacturer of the inner jacket material, FR-6075, the fire retardant components of the material release water when exposed to high heat. Next, the combination was crosshead extruded with SGX 96-546 FA-BA PVC material manufactured by AlphaGary Corporation, Pineville, N.C., USA so that the outer jacket covered the whole perimeter of the combination with a thickness of 2.54 mm. The Example 6 assembly was flame tested by Underwriters Laboratory (UL) according to UL 910 procedures, and the assembly failed. It is postulated that the PVC outer layer was not able to contain the exuding materials, namely water, being diffused out of the inner layer and/or the outer layer generated excessive smoke.

Example 7

An assembly having a notched, clad core sub-assembly in a channel surrounded by a jacket, similar to Example 1, was prepared. However, in Example 7 the channel was made from UV-tec FR-6688 fire retardant, non-intumescent exuding material manufactured by UV-tec, Arlington, Tex., USA. According to manufacturer FR-6688 contained magnesium hydroxide in higher proportions than FR-6075 and reportedly in excess of 50%. The assembly was jacketed with THV-500 fluoropolymer manufactured by Dyneon (formerly 3M Company). The assembly was subjected to Mil Spec C 24643 A Flame Test. The assembly passed the flamability test as specified by the U.S. Navy. It is postulated that the compounds exuded from the channel material, believed to be water, upon the exposure to heat and flame contributed to extinguishing the flame.

Example 8

Example 7 was repeated, except that FEP Teflon® FEP 100J manufactured by E. I. Dupont de Nemours of Wilmington, Del., U.S.A. was used for the jacketing. The assembly was subjected to Mil Spec C 24643 A, Flame Test; the NES 711 Smoke Index Test; and the NES 713 Toxicity Index Test. The assembly passed all three tests as specified by the U.S. Navy. It is postulated that the compounds exuding from the channel material upon exposure to heat and flame contributed to extinguishing the flame while the outer fluoropolymer in combination with the inner layer contributed to lowering the toxicity and smoke generation.

Example 9

Example 6 was repeated, except that fire retardant material designated as UV-tec FR-6688, manufactured by UV-Tec, Arlington, Tex., USA, was used in the first jacket and, except that PVDF Solef 31508-0009 manufactured by Solvay was used for the jacket. The assembly was subjected to Military Specification C24643A, Naval Engineering Standards NES 711 (Smoke Index Test) and Naval Engineering Standards NES 713 (Toxicity Index Test). The assembly passed all tests as specified by the U.S. Navy. It is postulated that the compounds exuding from first jacket upon exposure to heat and flame contributed to extinguishing the flame while the outer fluoropolymer in combination with the inner layer contributed to lowering the toxicity and smoke generation.

Example 10

Lengths of SWN-500, with an outer diameter of about 12 mm, clad-core fiber optics sub-assemblies, manufactured by Lumenyte International Corporation, Irvine, Calif., U.S.A., were selected as the light transmitting component. A layer of approximately 2.8 mm wall thickness, fire retardant material designates as UV-tec FR-6688, manufactured by UV-tec, Arlington, Tex., U.S.A. was crosshead extruded over the clad-core sub-assembly to form a first jacket. Next, a layer of approximately 2.7 mm thickness, FEP Teflon® FEP 110L (Black) manufactured by E. I. DuPont de Nemours, Wilmington, Del., U.S.A. was crosshead extruded over the first jacket to form a second, or outer jacket. The assemblies were subjected to the Mil Spec C 24643 A Flame Test; the NES 711 Smoke Index Test; and the NES 713 Toxicity Index Test. The assemblies successfully passed all three tests as specified by the U.S. Navy. It is postulated that the exuding compound from the first layer jacket, in combination with the second layer jacket contributed to make the optic fire-extinguing, with low toxicity and smoke generation.

Example 11

Example 10 was repeated, except that PVDF Solef 31508-0009 manufactured by Solvay, USA, was used as an outer layer by crosshead extrusion over the clad-core sub-assembly to form the second, outermost jacket. Example 11 was tested as was Example 10 and yielded the same results. It is postulated that the exuding compound from the first layer jacket in combination with the second layer jacket contributed to make the fire optic fire-extinguishing, with relatively low toxicity and smoke generation.

Within the principles of the present invention as described, shown and exemplified above, several preferred applications of the inventive features, as directed to specific uses, will be described. The first is that enough fire retardant material be used in the fiber optic assembly so that in the presence of fire, the fire retardant material will retard and/or extinguish not only the base material used in the layer, e.g., an inner jacket or a channel, but also will retard and/or extinguish fire in the other, adjacent areas of the fiber optic assembly, such as the clad core, that may be burning. While the exact amount of fire retardant may vary from application to application, it is important to provide sufficient fire retardant material to achieve this end result.

The second is that the volume of the layer containing the fire retardant material in relation to the volume of the clad core be minimized, provided that the fire retardant modified fiber optic will pass the applicable flame, smoke and/or toxicity tests. In this regard, a volume ratio of about 2:1 to less than 2:1 is useful; a ratio of about 1 to 1 volume of fire retardant containing layer to clad core volume is preferred; and a ratio of less than 1 to 1 is most preferred. As will be appreciated, some variation in the ratios will result depending on the particular clad core material, particular base material used for the jacket or channel, and particular fire retardant material chosen.

The third is that for LCPOF applications, i.e., those in which the fiber optic has a core diameter in the range of about 3.0–25.0 mm, the proportion of the weight of the fire retardant material in relation to the weight of the base material used for the inner jacket or channel must be greater than the proportion used for smaller diameter plastic fiber optic. It is presently believed that for LCPOF applications the weight of the fire retardant material must be at least about one-half the weight of the base material in order to provide an illumination LCPOF that will pass the flame, smoke and toxicity tests referred to above in Example 10.

It is understood that the above-described preferred embodiments examples, and figures are simply illustrative of the general principals of the present invention. Other formulations, arrangements, assemblies and materials may be used by those skilled in this art and which embody the principals of the present invention, which is limited only by the scope and spirit of the claims set forth below.

What is claimed is:

1. An illumination fiber optic conduit assembly comprising:
    a clad core sub-assembly including at least one polymeric, thermoset visible light transmitting core having a visible light transmitting fluoropolymer cladding;
    a first polymeric layer at least partially surrounding the sub-assembly;
    a second polymeric layer surrounding said first polymeric layer and said subassembly; and
    a predetermined quantity of fire retardant material extending along the length of the conduit, positioned between said clad core sub-assembly and said second polymeric layer, and at least partially surrounding the radial periphery of the clad core;
    wherein the clad core sub-assembly includes a single clad core, the first layer is a U-shaped channel formed of an intumescent material and the second layer is a jacket completely surrounding the radial periphery of the channel and the clad core sub-assembly.

2. The assembly of claim 1 wherein the intumescent material includes ethylenepropylene copolymer and ammonium polyphosphate.

* * * * *